G. W. SCHULTZ.
MOTOR KITE FLYING MACHINE.
APPLICATION FILED DEC. 14, 1907.
1,043,147.
Patented Nov. 5, 1912.
6 SHEETS—SHEET 3.
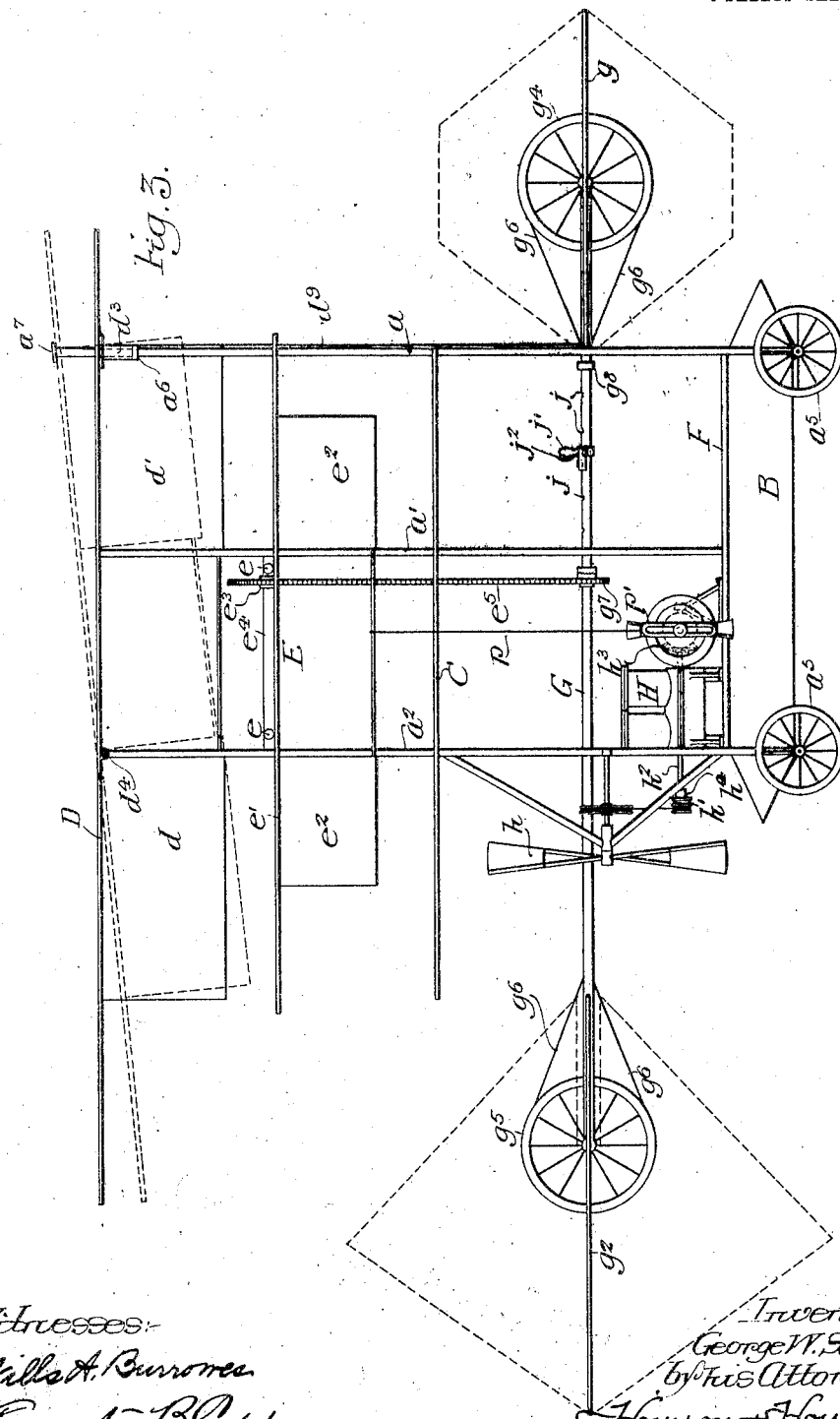

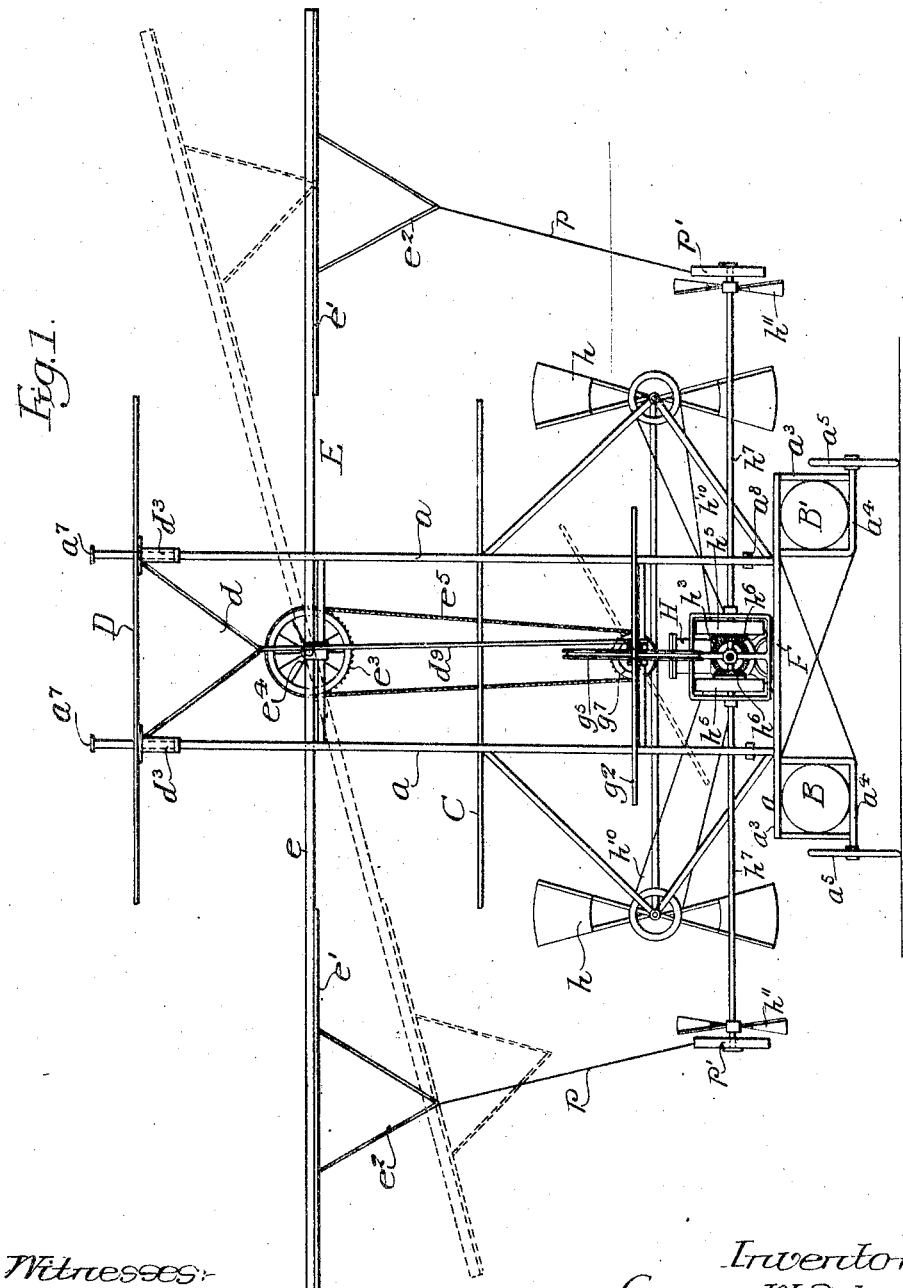

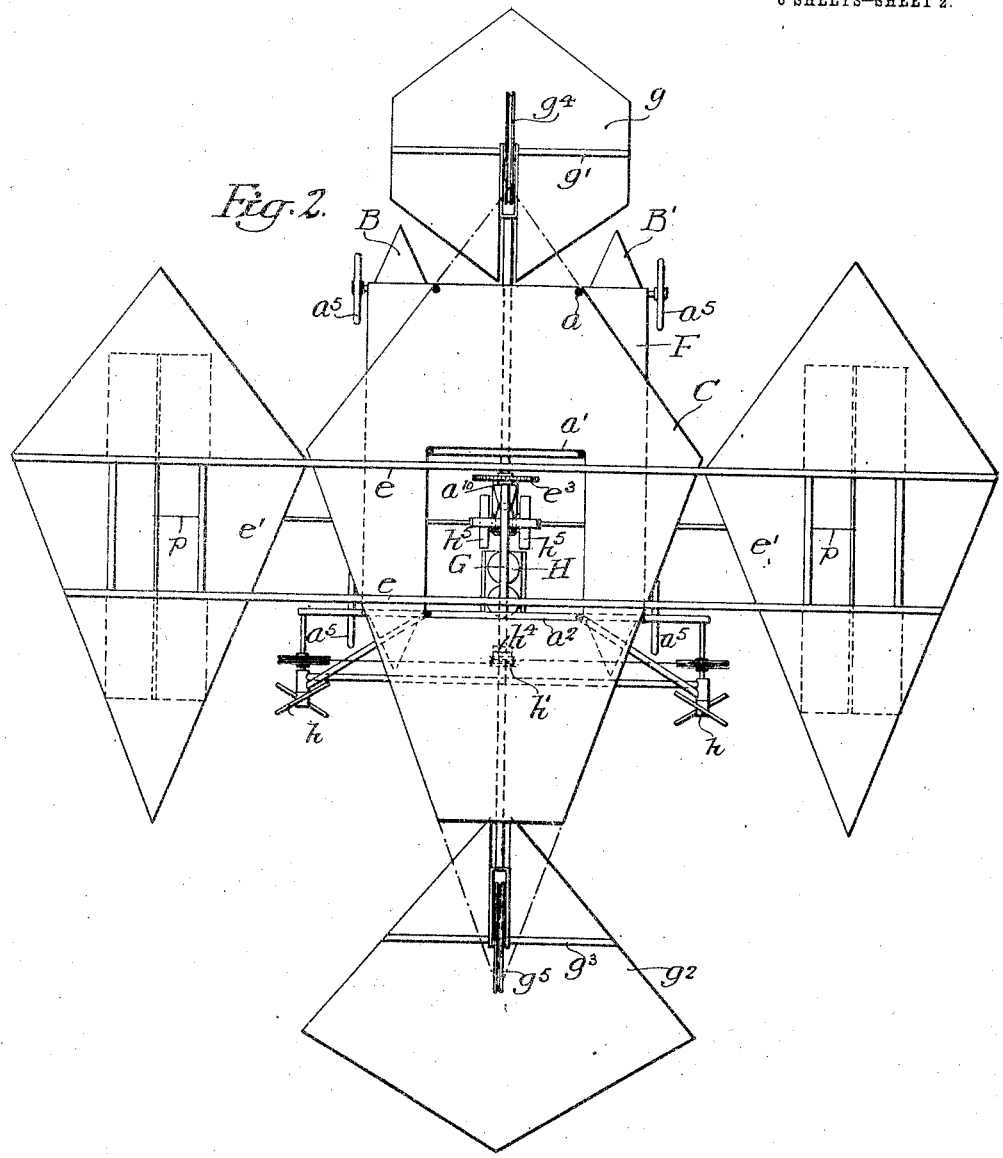

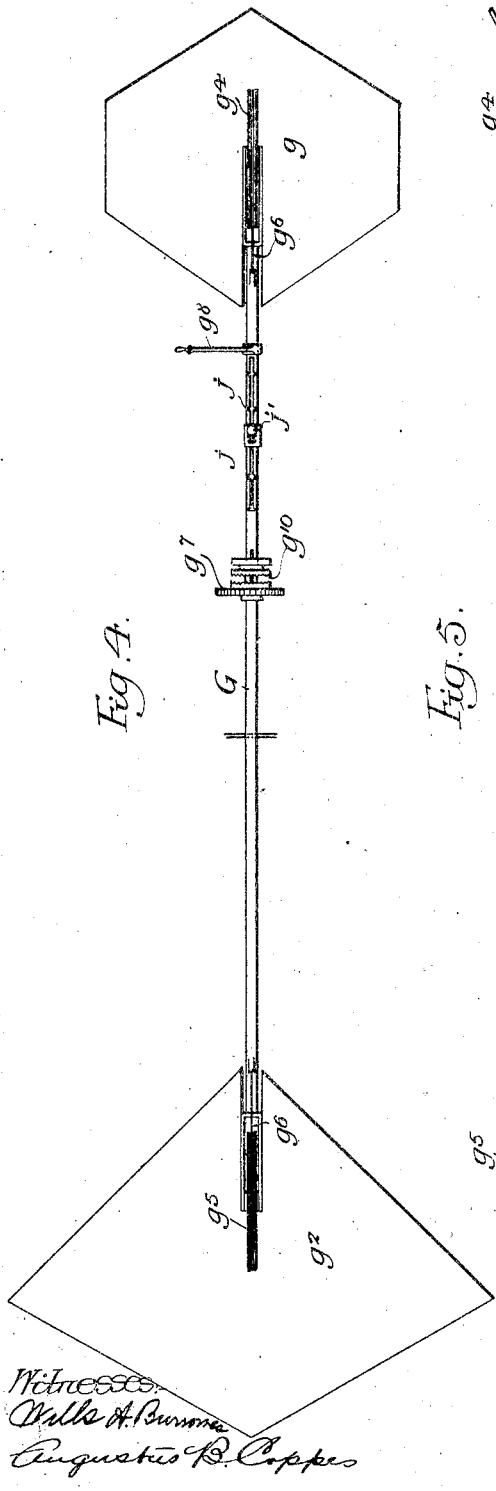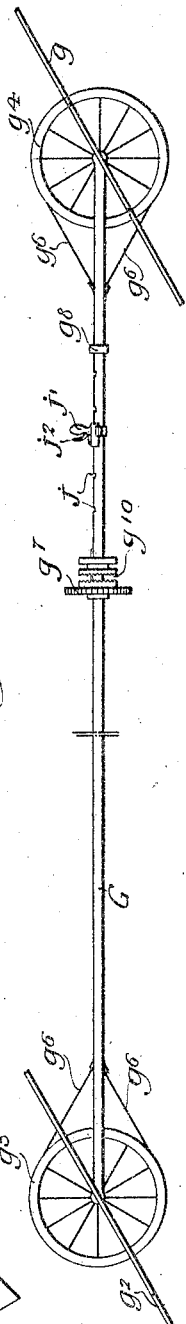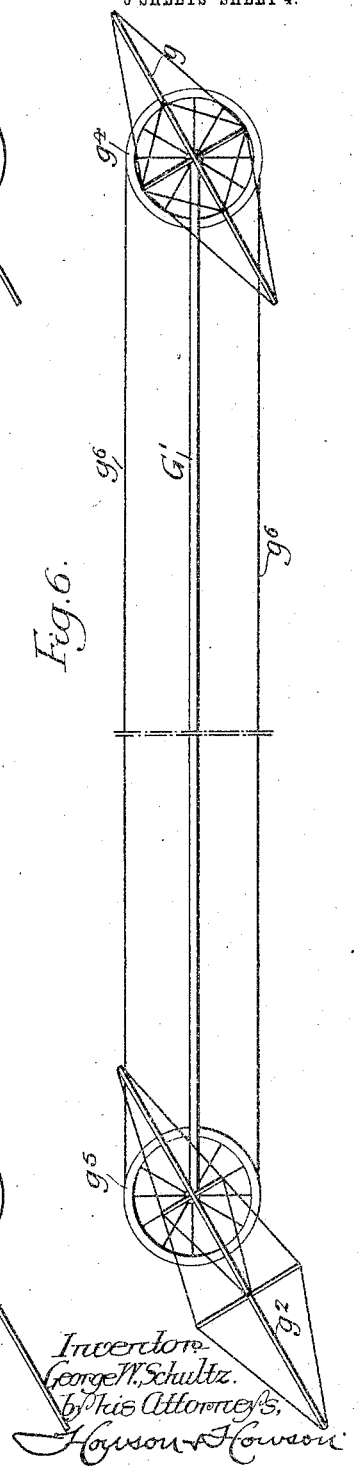

G. W. SCHULTZ.
MOTOR KITE FLYING MACHINE.
APPLICATION FILED DEC. 14, 1907.

1,043,147.

Patented Nov. 5, 1912.
6 SHEETS—SHEET 5.

Witnesses:
Wills A. Burrows
Augustus B. Coppes

Inventor
George W. Schultz.
by his Attorneys,
Howson & Howson

G. W. SCHULTZ.
MOTOR KITE FLYING MACHINE.
APPLICATION FILED DEC. 14, 1907.
1,043,147.
Patented Nov. 5, 1912.
6 SHEETS—SHEET 6.
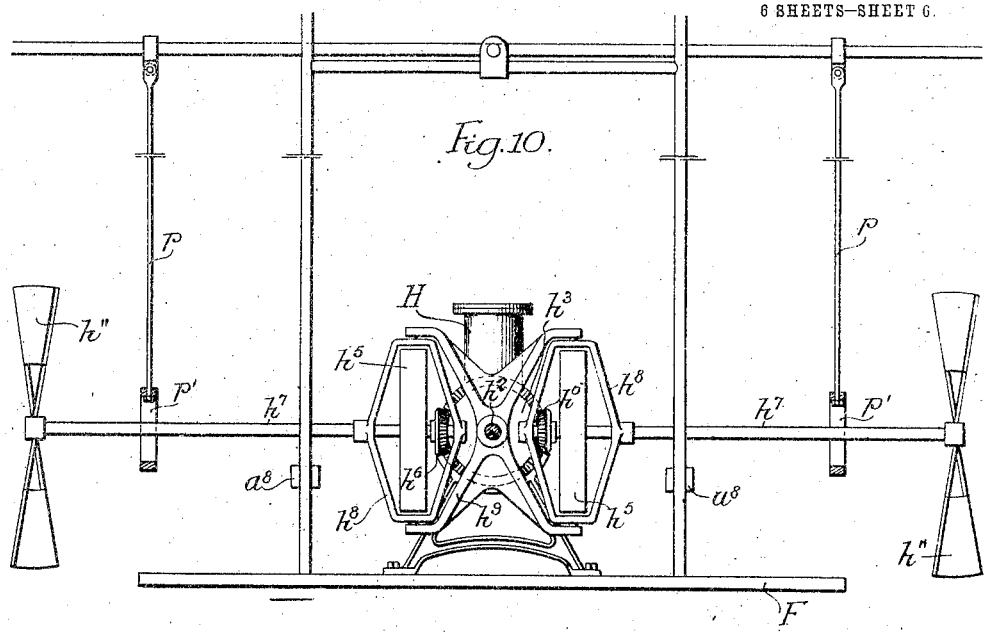
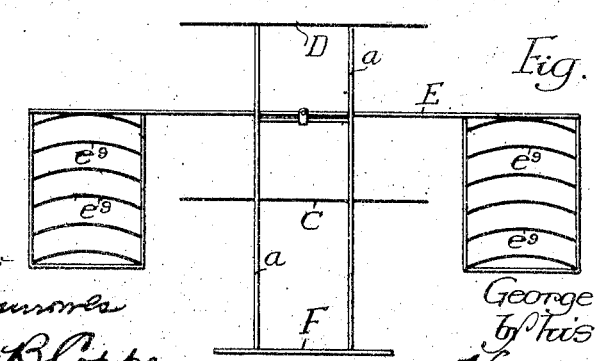

UNITED STATES PATENT OFFICE.

GEORGE W. SCHULTZ, OF WAYNE, PENNSYLVANIA.

MOTOR-KITE FLYING-MACHINE.

1,043,147.

Specification of Letters Patent.

Patented Nov. 5, 1912.

Application filed December 14, 1907. Serial No. 406,440.

*To all whom it may concern:*

Be it known that I, GEORGE W. SCHULTZ, a citizen of the United States, residing in Wayne, Pennsylvania, have invented certain Improvements in Motor-Kite Flying-Machines, of which the following is a specification.

One object of my invention is to provide a flying machine of the aeroplane or "heavier-than-air" type, which shall be capable of sustaining itself in the air, together with one or more passengers and material to be transported.

It is further desired to provide such a machine with relatively simple and at the same time practical and reliable devices for causing it to begin a flight from rest and for controlling its movements after it has left the ground.

Another object of the invention is to provide a flying machine having the above noted characteristics, with means whereby its equilibrium is maintained in the air and it can be more easily controlled as regards its upward, downward and sidewise movements than has hitherto been possible.

A further object of the invention is the generation and utilization of centrifugal force for increasing the stability of the machine on its natural center of gravity while in the air.

I also desire to provide a machine, which while being capable of sustaining and propelling itself in any direction through the air shall also be capable of operation upon land or water.

These objects and other advantageous ends I secure as hereinafter set forth, reference being had to the accompanying drawings, in which:—

Figure 7:
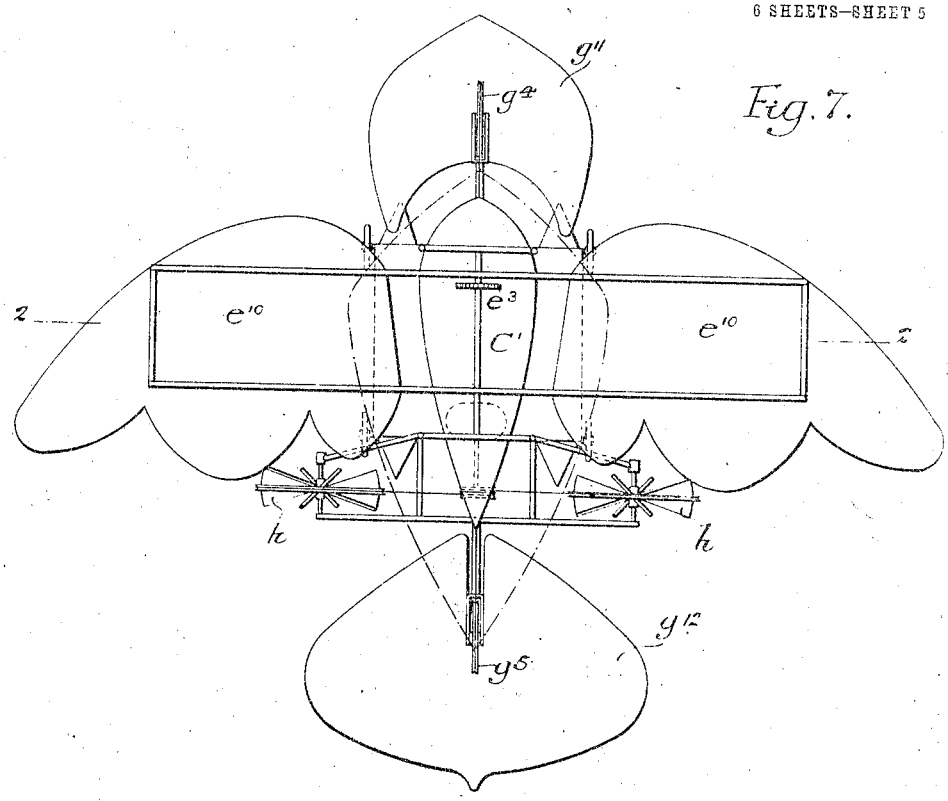
Figure 8:
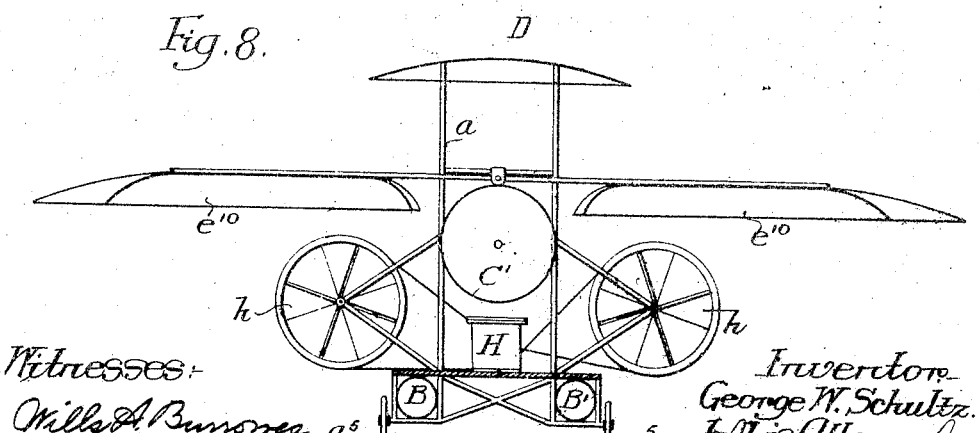

Figure 1, is a front elevation of one form of my invention; Figs. 2 and 3, are respectively a plan and a side elevation of the machine shown in Fig. 1; the upper aeroplane being omitted from the former figure; Figs. 4 and 5 are respectively a plan and a side elevation of the rudders and their controlling mechanism; Fig. 6, is a side elevation of a modified construction of the rudders; Fig. 7, is a plan of a modified form of my flying machine, illustrating the application of the general principles of my invention to another arrangement of parts; Fig. 8, is a front elevation of the device shown in Fig. 7; Fig. 9, is a diagrammatic end elevation of a machine having a special form of side aeroplanes or wings; Fig. 10, is a side elevation of the device for insuring lateral stability of high speed machines having relatively narrow side wings.

In the above drawings $a$ $a'$ and $a^2$ represent three upright frames braced together in any suitable manner, the first and last of these being extended, as indicated at $a^3$ in Fig. 1, to provide for the attachment of a pair of hollow pointed cylinders B and B', extending longitudinally of the machine and made of relatively light sheet material, usually metal, so as to be water and air tight. Each of these extensions $a^3$ of the frame is provided with a portion $a^4$ constructed to serve as the axle of a wheel $a^5$ whereby the machine may be supported so as to be capable of operation as a road vehicle. Extending between and connecting the frames are two aeroplanes C and D of a kite shape form; the latter being mounted at the top of the structure on the frames $a$, $a'$ and $a^2$, and being pivoted or hinged to the last frame. The second of these aeroplanes indicated at C is placed approximately midway between the plane D and the bottom of the machine, and is preferably, though not necessarily, of less length than said plane with which it is parallel. This top plane D has extending downwardly from its under side a pair of cellular structures $d$ and $d'$ which, in the present instance, are in the form of open ended triangular prisms, and may be made in the manner common in the construction of box kites, cellular, superposed or plain kites without departing from my invention. The planes C and D are provided with square openings in their centers as indicated in Fig. 2, and would fly as a type of cellular kite if sent up in the usual way by a cord. The openings being in the center allow for the exit of compressed air as the machine is descending, thereby preventing gyration and causing it to act as a parachute in case of failure of the motive power in mid air. Under operating conditions the machine would gravitate vertically or spirally to the earth, thus assuring safety and freedom from violent shock on alighting.

The structures $d$ and $d'$, as well as the planes C and D, with the wings and the rudder, hereafter noted, are constructed of relatively light frames of spruce wood, bamboo or metallic tubing, over which is tightly stretched some oiled and water-proof fabric impervious to air, though in certain cases it may be possible to employ thin sheet metal attached to the frames of the aeroplanes, etc., in any suitable manner.

The aeroplane D is preferably attached to its supporting framework $a^2$ by a transversely extending hinge or hinges $d^4$ so that it may be turned on a transverse axis to elevate its front edge to a predetermined extent. With this idea in view I provide the front portion of the plane with tubular guides $d^3$ filling the upright members of the frame $a$, which have collars $a^6$ to prevent downward movement of said front portion $d^2$ below the horizontal and also heads $a^7$ to limit the possible elevation thereof. The raising and lowering of the front edge is accomplished by means of a rod $d^9$ extending downwardly to a point adjacent to the platform and constructed to be hooked or otherwise attached to a fixed portion to maintain the aeroplane B in its normal position under running conditions.

Extending transversely of the machine, preferably between the two frames $a'$ and $a^2$ and at a point about midway between the planes C and D, is a framework E, shown both in full and in dotted lines in Fig. 1, which includes two relatively long parallel bars $e$ having at their ends kite-shaped planes $e'$ designed to serve as wings. Each of said wing planes has projecting downwardly from its under side a prismatic cellular structure $e^2$ open at the ends and extending parallel with the general line of the machine; there being preferably though not necessarily rectangular openings through the central parts of these planes as shown. As indicated in connection with the structures $d$ and $d'$ of the plane D, any other form of box, cellular, plain kite or wing shaped construction may be substituted for these aeroplanes as desired.

The framework E is mounted and balanced upon a horizontal, longitudinally extending shaft $e^4$ carried in suitable bearings and movable therein to a limited extent as a horizontal axis in order to place the planes $e'$ at an angle to the planes of the structures C and D.

Mounted just above the hollow floats B and B' is a platform F extending between the frames $a$ and $a^2$ and serving for the support of an operator, the motor or engine, and any supplies or apparatus to be transported. Between this platform and the plane C is mounted a longitudinally extending rudder shaft G which, as illustrated in Figs. 1 to 3 inclusive, is mounted in bearings on the framework of the machine and carries at its forward end a plane $g$ provided with a transverse spindle $g'$ movably carried by said rudder shaft so as to be capable of being moved to be at any desired angle relatively to the fixed planes C and D. This rudder shaft projects at the front of the machine, while similarly carried on the rudder shaft G at the rear of the machine is a second rudder plane $g^2$ which, like the first, has a transverse spindle $g^3$, so that it also may be brought to any desired angle relatively to the plane C. For the purpose of controlling the position of these rudder planes and moving them at will, I provide upon the front spindle $g'$ a pulley wheel $g^4$ and upon the rear spindle $g^3$ a pulley wheel $g^5$ operatively connecting said pulley wheels by a rope or cable $g^6$, extending in the present instance through the rudder shaft, which is made tubular for the purpose. At some convenient point where the rudder shaft passes over the platform F, I provide in it a longitudinally extending slot having a number of side notches $j$. To one run of the cable $g^6$ I fix an operating handle $j'$ which projects through said slot and provide this with any desired form of spring latch operated by an auxiliary handle $j^2$. This latter is capable of entering any of the notches $j$, and by means of this handle the cable may be moved to turn the pulley wheels $g^4$ and $g^5$ and thereby alter the angles of the front and rear rudder planes.

Upon the rudder shaft G is mounted a sprocket wheel $g^7$ provided with any desired form of clutch $g^{10}$ whereby it may be operatively connected to or disconnected from said shaft at will and there is also fixed to said shaft an operating handle $g^8$, whereby it may be turned in its bearings to bring the rudder planes into such positions that their spindles are at right angles to the plane C. I also mount a sprocket wheel $e^3$ upon the shaft $e^4$ which carries the wing frame E and connect these two sprocket wheels by a chain $e^5$ so that when desired the wing frame may be turned at any desired angle, either in connection with or independently of the rudder shaft and the rudder planes, depending on whether or not the clutch $g^{10}$ is thrown into action.

The engine H for driving the machine is mounted in any suitable manner upon the platform F of the machine, preferably below the rudder shaft G and it is so placed that its main shaft $h^2$ extends longitudinally of the machine to a bearing $a^{10}$ on the frame. This shaft has mounted on its end a double grooved pulley $h'$ and includes a clutch $h^4$ whereby said pulley and the parts actuated therefrom may be disconnected at will from the engine. Turned in opposite directions from the pulley through any desired belts or chains are a pair of propellers $h$ which serve to drive the machine regardless of whether it operates upon air, water or land.

The front end of the engine shaft has a disk fly-wheel $h^3$ provided with teeth engaging gear wheels $h^6$ on shafts $h^7$ so as to turn two heavy fly wheels $h^5$ mounted thereon in opposite directions; the said wheels thus constituting a double gyroscope. These shafts are mounted in bearings formed in frames $h^8$ rigidly mounted upon a single frame $h^a$, rotatably carried on the shaft $h^2$ as an axis, so that this latter frame may oscillate in a vertical plane but not otherwise.

The axles or shafts $h^7$ are extended out under the side wings of the machine and in order to limit their possible oscillation in a vertical plane I mount upon the side members of the main frame of the machine, stops $a^8$ so placed that under predetermined conditions they will engage said shafts. From each end or other suitable point upon the frame E, I mount a downwardly extending rod or bar $p$ having at its lower end a loop or slotted portion $p'$ through which extends one of the shafts $h'$; the arrangement being such that in the event of the frame turning on its axis more than a predetermined amount from its normal position parallel with said shafts, one or the other of the slotted ends $p'$ of the rod will engage its shaft. The ends of the shafts $h^7$ are provided with screws or fans $h^{11}$ whereby under operating conditions air may be drawn in toward the center of the machine or exhausted therefrom as may be found conducive to best results under operating conditions. As a result of such action a considerable volume of air is or may be drawn in under the central parts of the aeroplane so as to assist in buoying it up and at the same time materially add to its stability.

It is to be noted that the belts or chains $h^{10}$ are so arranged that the propellers $h$ are driven in opposite directions, it being understood that their design is such that under these conditions they act together to propel the machine either forward or backward.

As indicated at $h^4$ in Fig. 2, I may place any suitable form of clutch between the main shaft of the engine and the propellers so that these may be thrown into and out of action without interfering with the operation of the fly wheels of the gyroscope, which under working conditions are at all times in revolution.

One object of the fly wheels mounted as shown, is to produce the effect of a double gyroscope, which shall be capable of automatically maintaining the equilibrium of the machine against the action of wind pressure tending to tilt it laterally, the movement of the operator or any other force tending to deflect it from its proper position.

It will be understood that the main frame of the machine as well as the frames of the various planes, wings, sails, etc., are of any light, strong construction properly braced by tie members usually formed of piano wire.

In order to use the machine above described, I first run it along a road or other level tract and for this purpose drive it by means of the engine H. This, as will be understood, operates the fans or propellers $h$ at a high speed and as long as the various planes and wings of the machine are horizontal, provides no lifting force. If, however, the front and rear rudders be set at some such angle as indicated in Fig. 5, and the top plane D be moved to a position with its front portion raised, the machine immediately tends to rise owing to the upwardly acting component of the force resulting from the air striking the inclined surfaces of the rudders and the said plane D. After the machine has left the ground the continuous operation of the propellers still tends to drive it forward, while the level at which it moves may be determined by varying the angle of the rudders either with or without an adjustment of the aeroplane D.

By means of the handle $g^8$, the wings $e'$ of the frame E may be set at any desired angle to the aeroplane D and C so as to overcome the effects of any air currents tending to throw the machine out of its proper position. These side wings, which may, as previously noted be adjusted simultaneously with the rudders, have the functions of the wings of a bird in balancing or steering, while similarly, the front and rear rudders act in the same manner as do the head and tail of a bird to determine the level of flight. By means of the handle $j'$ the rudder planes are set at any desired angle as determined by the longitudinal position of said handle in the slot of the rudder shaft; it being held in any adjusted position by means of the engagement of its spring latch with the notches $j$.

In the event of the flying machine being tilted or displaced more than a predetermined amount from its normal level, one or the other of the slotted ends $p'$ of the rods $p$ engages one of the shafts $h^7$ and inasmuch as the rotation of the fly wheels tends to maintain these shafts at all times parallel to themselves, the side wings and the parts attached to them are prevented from moving at an abnormal extent beyond their safe positions. Similarly, should the machine as a whole be tilted or should it turn on a horizontal axis so as to be in danger of upsetting, one of the stops $a^8$ would engage the shaft $h^7$ adjacent to it and effectually prevent such dangerous movement of the machine. I am, therefore, enabled to maintain my machine on a substantially level keel, and if desired, in place of the four vehicle wheels at its sides as illustrated in Figs. 1, 2, etc., I may provide two or more wheels in the central plane of the machine, inasmuch as its balance is automatically maintained by the gyroscopic apparatus above described.

The various cellular structures $d$, $d'$ and $d^2$ act in the manner and perform the functions characteristic of cellular or box-kites and materially add to the lifting and steering power of the machine. If desired the wings or wing planes may be constructed as shown in Fig. 9, so that there is at each end of the wing frame E a plurality of superposed double or multiple planes $e^9$ held together and to said frame in any suitable manner.

Owing to the fact that the engine, operator and wheels are carried upon the lower half of the machine, the center of gravity of the structure as a whole is considerably below its center, with the result that its stability under operating conditions is exceptionally high.

As is obvious, the floats B and B' keep the machine from sinking should it alight on the surface of water, while the propellers serve to move the machine regardless of whether it operates in the air, water or upon the surface of the earth.

In case it should be desired to have the rudder controlling cable outside the rudder shaft G this may be constructed in the manner illustrated in Fig. 6, with the cable extending in straight lines directly between the wheels $g^4$ and $g^5$. In any case the rudder planes are properly trussed or braced so as to prevent any distortion which might otherwise occur in a strong wind.

In Figs. 7 and 8, I have illustrated a modified form of my machine in which its various parts have been made to more closely conform to the analogous parts of a bird; certain of its various surfaces or aeroplanes being cancavo-convex in contradistinction to the flat aeroplanes employed in the motor kite form of my invention. For this purpose the planes $e'$ of the wing structures are given concavo-convex forms more nearly approaching those of a bird's wing, as indicated at $e^{10}$ though the front and rear rudder planes $g^{11}$ and $g^{12}$ are perfectly flat surfaces. The lower plane C is replaced by a hollow sheet metal body C' blunt pointed at its forward and more sharply pointed at the rear, which under operative conditions is intended to receive passengers, material to be transported, etc. In spite of these changes, however, it is obvious that this form of the invention depends for its operation upon the same principles as those characterizing that form of my device illustrated in Figs. 1 to 4 inclusive, there being as in this other form a top plane D', which, however, is of a concavo-convex construction.

In the motor kite flying machine above described the object is to construct a relatively slow speed but safe device designed to carry one man and to move with its planes at a considerable angle of incidence to the air. The side or transverse spread of its wings is preferably not greater than the total length of the machine and its fore and aft rudders are placed a considerable distance apart with the center of gravity relatively low, so that as a result the longitudinal stability is easily under the control of the operator in case there should be encountered a sudden gust of wind coming from the front. When, however, it is desired to provide a machine capable of greater speed and having an increased weight carrying capacity, such as that shown in Figs. 7 and 8, I employ relatively narrow wings of wide lateral expanse, raise the center of gravity nearly to the level of the wing planes and in order to secure longitudinal stability at a small angle of incidence as is necessary for rapid flight, place the fly wheels of the gyroscope so that they normally lie in horizontal planes. The trunnions for the fly wheel frames are on the sides of the machine, so as to permit the axes of the fly wheels to move only in a direction longitudinal with the machine.

I claim:

1. The combination in a flying machine of an aeroplane, an engine, two fly wheels placed some distance apart one on each side of the engine and driven thereby, and propellers also driven by said engine, said fly wheels being placed on axes at right angles to the axes of the propellers.

2. The combination in a flying machine of a frame, an aeroplane thereon, a driving motor, and a propeller or propellers actuated thereby to force the machine forward, said aeroplane having a central unobstructed opening and a transversely extending adjustable structure mounted on said frame and having an aeroplane on each end.

3. The combination in a flying machine of a frame, an aeroplane thereon, a driving motor, and a propeller or propellers actuated thereby, a rudder, with mechanism independent of said rudder for maintaining the stability of the machine, said aeroplane having an opening placed to also maintain its stability during the descent of the machine, independently of said mechanism, and an adjustable transversely extending structure mounted on the frame and provided at each end with an aeroplane.

4. The combination in a flying machine of a frame; propelling means; a transversely extending structure movably mounted on the frame; an aeroplane rigidly and permanently connected to each end of said structure; and means for adjusting the transverse inclination of the structure both automatically and by hand.

5. The combination in a flying machine, of a plurality of substantially parallel aeroplanes, of which the uppermost is capable of being moved at an angle to another, with a transversely extending structure adjustable on an axis extending longitudinally of the machine, an aeroplane at each end of said structure, a motor, and propelling means driven thereby.

6. The combination in a flying machine of an upper and a lower areoplane, propelling means, and a transversely extending frame mounted between said two planes, said frame having an aeroplane at each end, said planes being spaced apart from each other.

7. The combination in a flying machine of a frame, an aeroplane, propelling means, a transversely extending frame adjustably connected to said frame and provided at each end with an aeroplane, with means for varying the position of said frame to vary the angle of its aeroplane to the first aeroplane.

8. The combination in a flying machine of a supporting structure, an upper and a lower aeroplane attached thereto, propelling means, with a transversely extending frame mounted between said aeroplanes, said latter frame having at each end a supplementary aeroplane and being adjustable on an axis extending longitudinally of the machine.

9. The combination in a flying machine of a supporting frame, an upper and a lower aeroplane attached thereto, propelling means, and a transversely extending frame mounted between said aeroplanes, said latter frame having at each end a supplementary aeroplane and being adjustable upon an axis extending longitudinally of the machine, each of said aeroplanes on the adjustable frame having attached to it a cellular kite structure.

10. The combination in a flying machine of a supporting frame, an aeroplane at the top thereof having projecting from its under side and rigidly connected to it two cellular kite structures spaced apart and respectively placed adjacent to the front and rear of the aeroplane, with their longitudinal axes in the median plane of the machine, and an adjustable laterally extending member having a plane on each side of the center of the machine.

11. The combination in a flying machine of a supporting frame, an aeroplane at the top thereof having projecting from its under side a cellular kite structure, with propelling means for said machine, and a transversely extending structure provided at its ends with aeroplanes, each also provided with a cellular kite structure.

12. The combination in a flying machine of a supporting frame having an aeroplane, propelling means mounted on the frame, a tubular slotted rudder shaft, two pulley wheels carried by said shaft, an endless cable extending through the rudder shaft and connecting said wheels, an operating bar connected to said cable so as to project through the slot in the rudder shaft, with a rudder connected to each of said wheels so as to be movable therewith.

13. The combination of a supporting frame having a hollow float or floats, a motor, a propeller or propellers driven therefrom, one or more aeroplanes mounted above said propeller or propellers, and wing structures projecting at each side of the frame, said structures including a transversely extending frame having an aeroplane at each end.

14. The combination of a supporting frame having a hollow float or floats, a motor, a propeller or propellers driven therefrom, one or more aeroplanes mounted above the propeller or propellers, and wing structures at each side of the frame having a frame mounted to be adjustable on an axis extending longitudinally of the machine.

15. A flying machine consisting of a main frame, vehicle wheels mounted thereon, a motor, a propeller or propellers driven from the motor, an aeroplane mounted above the motor, means for raising at will the front portion of said aeroplane relatively to the rest of the machine, with means consisting of headed projections fixed to the frame for limiting the amount of such elevation of the front portion.

16. The combination with a flying machine of a gyroscopic device, the same consisting of two similar heavy rim fly wheels mounted close together adjacent to the center of gravity of the structure, means for rotating said wheels at relatively high but equal speeds in opposite directions, each wheel having a separate supporting shaft extending outwardly, with a propeller on each shaft for producing side currents of air.

17. The combination in a flying machine of an aeroplane, a frame, a pair of shafts extending transversely of the machine below the aeroplane, fly wheels on said shafts, and means for turning the fly wheels in opposite directions.

18. The combination in a flying machine, of an aeroplane, a frame, shafts extending transversely of the machine below the aeroplane, fly wheels on said shafts, means for turning the shafts, a longitudinally extending rudder shaft, a rudder or rudders mounted on said latter shaft, and propelling means for the machine.

19. In a flying machine, the combination of a frame having attached to it an aeroplane, a transversely extending frame having side wings and so mounted upon said first frame that the latter may be free to turn about a longitudinal axis; a motor; gyroscopic apparatus driven by the motor; and mechanism connecting said apparatus to the transverse frame to limit the turning thereof.

20. In a flying machine, the combination of a frame having attached to it an aeroplane; a laterally extending balancing device so mounted upon said first frame that the latter may be free to turn about a longitudinal axis; a motor carried by the machine; gyroscopic apparatus driven by the motor; and mechanism connecting said apparatus with the balancing device to limit the possible movement thereof.

21. The combination of a main frame having one or more aeroplanes, a motor mounted on the frame, gyroscopic apparatus driven by the motor including transversely extending shafts, said gyroscopic apparatus being pivotally mounted on an axis extending longitudinally of the machine, with stops on the frame placed to engage said shafts in the event of relative movement of the apparatus and frame beyond a predetermined amount.

22. The combination in a flying machine, of a frame, having one or more aeroplanes, a motor mounted on the frame, a propeller or propellers actuated therefrom, gyroscopic apparatus also driven by the motor and including a transversely extending shaft or shafts, a fan or fans carried by said shaft or shafts, and means whereby abnormal tilting of the frame is prevented by the gyroscopic apparatus.

23. The combination in a flying machine of a frame having one or more aeroplanes; a motor mounted on the frame; a propeller or propellers driven thereby; a transversely extending shaft or shafts having actuating means; a fan or fans on said shaft or shafts placed laterally beyond and outside of the line of said propeller or propellers to draw in air under the aeroplane or aeroplanes; and gyroscopic stabilizing means operative on said shaft r shafts.

In testimony whereof I have signed my name to this specification, in the presence of two subscribing witnesses.

GEORGE W. SCHULTZ.

Witnesses:
 FRANK SMITH,
 C. R. KENNEDY.